US012677169B2

(12) United States Patent
Kwok et al.

(10) Patent No.: US 12,677,169 B2
(45) Date of Patent: Jul. 7, 2026

(54) SWITCHING BETWEEN NEW RADIO DUAL CONNECTIVITY AND CARRIER AGGREGATION IN CELLULAR NETWORKS

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/543,872

(22) Filed: Dec. 18, 2023

(65) Prior Publication Data

US 2024/0121855 A1     Apr. 11, 2024

Related U.S. Application Data

(63) Continuation of application No. 17/991,616, filed on Nov. 21, 2022, now Pat. No. 11,864,260, which is a
(Continued)

(51) Int. Cl.
| | |
|---|---|
| *H04W 24/02* | (2009.01) |
| *H04L 41/0816* | (2022.01) |
| *H04W 72/04* | (2023.01) |

(52) U.S. Cl.
CPC ......... *H04W 24/02* (2013.01); *H04L 41/0816* (2013.01); *H04W 72/04* (2013.01)

(58) Field of Classification Search
CPC ................. H04W 76/27; H04W 76/15; H04W 36/00692; H04W 52/365; H04W 72/04;
(Continued)

(56) References Cited

U.S. PATENT DOCUMENTS

| | | | | |
|---|---|---|---|---|
| 2016/0142987 | A1* | 5/2016 | Blankenship | ......... H04W 76/27 370/350 |
| 2019/0305867 | A1* | 10/2019 | Tseng | .................... H04L 5/0053 |

(Continued)

FOREIGN PATENT DOCUMENTS

EP          3668220 A1      6/2020

OTHER PUBLICATIONS

"Yang et al., Service Cell Auxiliary Management Method, Network Device And Terminal Device, Oct. 11, 2017, CN 110832910" (Year: 2017).*
(Continued)

*Primary Examiner* — Kevin C. Harper
(74) *Attorney, Agent, or Firm* — Lee & Hayes, P.C.

(57) ABSTRACT

A telecommunication network associated with a wireless telecommunication provider can be configured to switch between New Radio (NR) Dual Connectivity (DC) and NR Carrier Aggregation (CA) in 5G cellular networks. According to examples, a UE is not limited to using a single mode (e.g., either NR CA or NR DC) that is initially selected for use by the UE. For example, a UE can be reconfigured during a session to switch from NR DC to NR CA when the UE moves toward mid-cell and/or a cell edge. In other examples, the UE can be reconfigured to switch from NR CA to NR DC when the UE moves closer to the cell. To determine when to switch, one or more network conditions (e.g., UE RF conditions) can be monitored. In some examples, a gNB can monitor power headroom reports (PHRs) received from the UE to determine when to switch.

20 Claims, 5 Drawing Sheets

Related U.S. Application Data continuation of application No. 17/070,564, filed on Oct. 14, 2020, now Pat. No. 11,510,272.

(58) Field of Classification Search
CPC .... H04W 88/06; H04W 24/02; H04L 41/0816
USPC ........................................................ 370/254
See application file for complete search history.

(56) References Cited

U.S. PATENT DOCUMENTS

| | | | | |
|---|---|---|---|---|
| 2020/0100235 A1* | 3/2020 | Jo | ......................... | H04W 80/02 |
| 2021/0007059 A1* | 1/2021 | Piipponen | ............. | H04L 5/0007 |
| 2021/0258839 A1* | 8/2021 | Tong | ................ | H04W 36/0069 |
| 2022/0117026 A1 | 4/2022 | Kwok et al. | | |
| 2023/0095413 A1 | 3/2023 | Kwok | | |

OTHER PUBLICATIONS

Extended European Search Report mailed Mar. 17, 2022 for European Patent Application No. 21200931.0, 10 pages.

Huawei, et al, "Enhancements to PDCP Duplication to Enable Dynamic Carrier Selection", vol. RAN WG2, Meeting #105, Feb. 15, 2019, 3 pages.

Nokia, et al, "UE Dynamic Power Sharing for LTE-NR Dual Connectivity", vol. RAN WG4, Meeting AH-1801, Jan. 15, 2018, 6 pages.

Office Action for U.S. Appl. No. 17/070,564, maile don Mar. 28, 2022, Kwok, "Switching Between New Radio Dual Connectivity and Carrier Aggregation in Cellular Networks", 13 pages.

Office Action for U.S. Appl. No. 17/991,616, mailed on Apr. 25, 2023, Inventor #1 Ming Shan Kwok, "Switching Between New Radio Dual Connectivity and Carrier Aggregation in Cellular Networks," 6 pages.

* cited by examiner

400 ⌐

SELECT NR DC OR NR CA FOR USE BY UE
402

ESTABLISH CONNECTION OF UE WITH CELLULAR NETWORK USING SELECTED
NR DC/NR CA
404

MONITOR ONE OR MORE NETWORK CONDITIONS
(E.G., TRANSMISSION POWER)
406

SWITCH FROM/TO NR DC BASED ON THE MONITORING
(SEE FIG. 5)
408

500

RECEIVE NETWORK CONDITIONS
(E.G., PHR REPORT)
502

SWITCH FROM NR DC TO NR CA
OR FROM NR CA TO NR DC?
504

NO

YES

SWITCH MODE FOR UE
506

SWITCHING BETWEEN NEW RADIO DUAL CONNECTIVITY AND CARRIER AGGREGATION IN CELLULAR NETWORKS

RELATED APPLICATIONS

This application is a continuation of and claims priority to U.S. patent application Ser. No. 17/991,616, filed Nov. 21, 2022, titled "SWITCHING BETWEEN NEW RADIO DUAL CONNECTIVITY AND CARRIER AGGREGA-TION IN CELLULAR NETWORKS," which is a continu-ation of and claims priority to U.S. patent application Ser. No. 17/070,564, filed Oct. 14, 2020, titled "SWITCHING BETWEEN NEW RADIO DUAL CONNECTIVITY AND CARRIER AGGREGATION IN CELLULAR NET-WORKS," the entirety of both which are incorporated herein by reference.

BACKGROUND

Modern terrestrial telecommunication systems include heterogeneous mixtures of second, third, and fourth genera-tion (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications Sys-tem (UMTS) is an example of 3G telecommunications technologies; and Long-Term Evolution (LTE), including LTE Advanced, and Evolved High-Speed Packet Access (HSPA+) are examples of 4G telecommunications technolo-gies. Moving forward, telecommunications systems include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the refer-ence number first appears. The use of the same reference numbers in different figures indicates similar or identical components or features.

DETAILED DESCRIPTION

Figure 1:
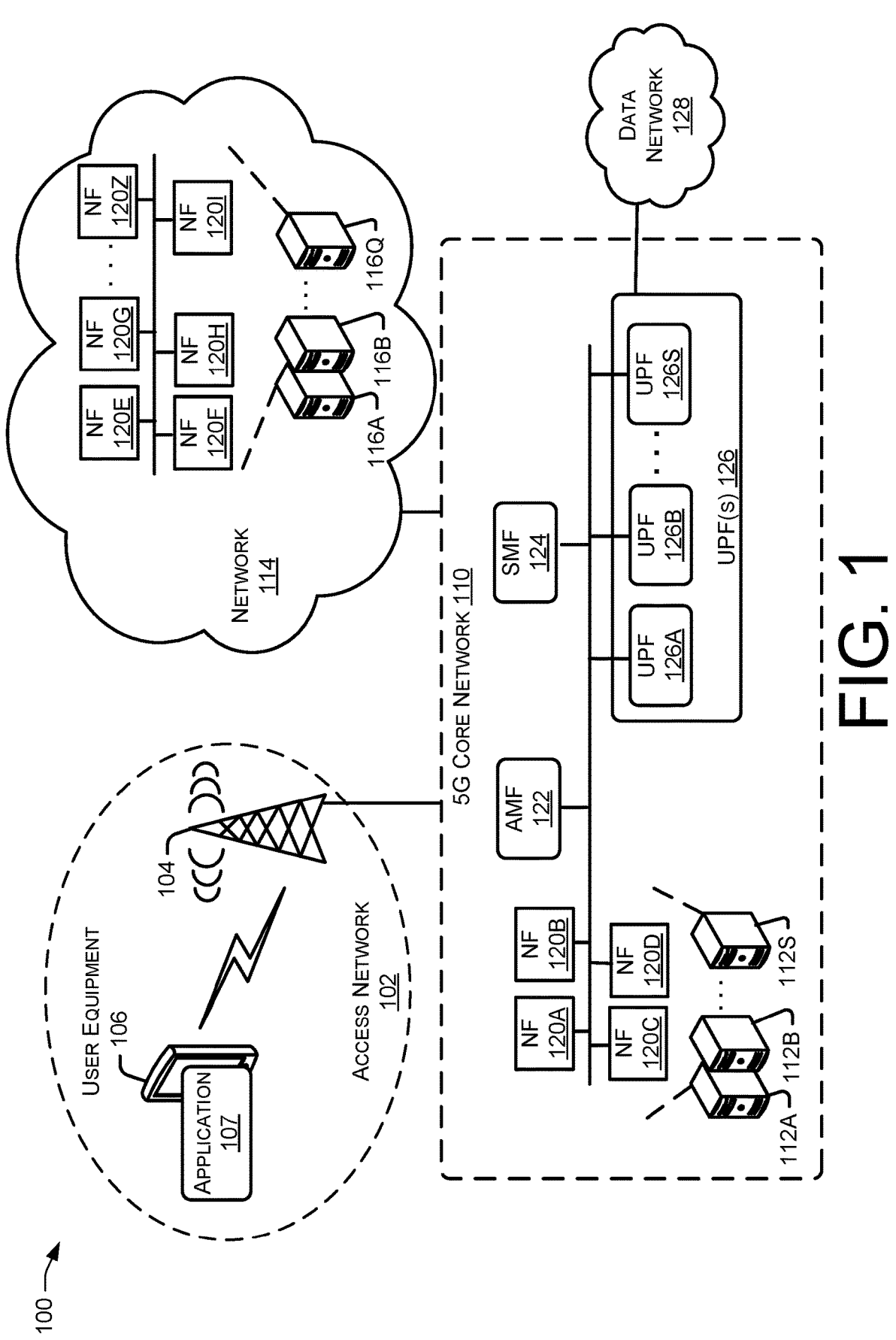
FIG. 1 is a block diagram of an illustrative environment showing switching between new radio (NR) dual connec-tivity (DC) and NR carrier aggregation (CA) in cellular networks.

Described herein are techniques and systems relating to switching between New Radio (NR) Dual Connectivity (DC) and NR Carrier Aggregation (CA) in cellular networks. NR DC refers to a user equipment (UE) connecting to different radio access nodes. For example, 5G NR DC can use a first gNodeB (gNb) that is associated with a first frequency band, and a second gNb that is associated with a second frequency band. In this way, the UE could use a first frequency band, such as millimeter waves for downlink, and a second frequency band, such as non-millimeter waves for uplink. NR CA refers to aggregation of multiple carriers that allows UE to simultaneously transmit and receive data using the aggregated carriers. For example, 5G NR CA may support aggregation for a number of component carriers (CCs) (e.g., 16 CCs (contiguous and non-contiguous), or some other number of CCs) from a single gNb.

Using techniques described herein, a UE is not limited to using the initially configured mode (e.g., either NR CA or NR DC) in a stand-alone (SA) 5G cellular network. For example, a UE can be configured to use NR DC during a communication session while the UE is near the cell, and switch to NR CA when the UE moves away from the cell and is closer to mid-cell or the cell edge. According to some examples, network conditions associated with the cellular network (e.g., RF conditions) are monitored and analyzed by node within the cellular network (e.g., gNB) to determine when to switch. In this way, user experience will be improved as the UE is more efficiently using the available radio access technologies.

As an example, a UE can be initially configured to use NR DC or NR CA at registration and/or upon completion of a hand-over procedure. After the initial configuration, the gNB can monitor power headroom reports (PHRs) received from the UE. The gNb may use data from the PHRs to determine when to switch from/to NR DC and/or pass this data to one or more other nodes to determine when to switch from/to NR DC.

Generally, a PHR indicates how much transmission power is left for a UE to use in addition to the power being used by a current transmission. In some configurations, the gNB, or some other device or component, determines if the UE transmission (TX) power indicates that the UE is near the gNB that represents a near cell condition, or if the UE TX power indicates that the UE is farther away from the gNB and the UE is experiencing mid-cell or cell edge conditions. For instance, if the UE is using NR DC, then when the PHR indicates that enough power is left for UE TX power, then the UE stays in NR DC mode. Conversely, when the PHR indicates that the UE is running out of TX power, then the UE can be reconfigured to use NR CA.

By switching to/from NR DC, poor performance of the UE (e.g., when the UE is near/on the cell edge) can be avoided. Further, by switching to NR CA from NR DC, the UE coverage can be extended using different frequency bands. Frequency bands for 5G wireless cellular networks are classified into different frequency ranges, such as FR1 and FR2 frequency ranges. FR1 uses the 4.1 GHz to 7.125 GHz band of frequencies, and FR2 uses the 24.25 GHz to 52.6 GHz band of frequencies. Generally, FR1 communi-cations are slower than but have more range compared to FR2.

The systems, devices, and techniques described herein can improve a functioning of a network by providing an architecture to switch between NR DC and NR CA based on one or more network conditions. For example, switching from/to NR DC may result in better performance for the UE. These and other improvements to the functioning of a computer and network are discussed herein. More details are provided below with reference to FIGS. 1-5.

FIG. 1 is a block diagram of an illustrative environment showing switching between new radio dual connectivity and carrier aggregation in cellular networks. The environment 100 may include an access network 102, a 5G core network 110, a network 114, and a data network 128 that is associated with a wireless service provider(s). The environment 100 is illustrated in simplified form and may include many more components.

The environment 100 may include cells, such as cell 104, that may be wireless or wired that are coupled to 5G core network 110 and/or some other network. The environment 100 may also include one or more access points (not shown), and one or more gateways (not shown). A cell, such as cell 104, may handle traffic and signals between electronic devices, such as the user equipment 106, and 5G CN 110. For example, a cell 104 may perform the transcoding of speech channels, allocation of radio channels to electronic devices, paging, transmission and reception of voice and data, as well as other functions. A cell 104 may include several base transceiver stations (BTS), each BTS may include a transceiver, antenna, and additional network switch and control equipment that provide a network cell for facilitating wireless communication between UE computing devices and the core network 110 and/or other networks. In some examples, the cells 104 may include one or more gNodeBs and/or one or more eNodeBs.

The UE 106 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 102, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with 5G CN 110, and/or other cellular networks. The UE 106 can further be configured to establish or receive a communication session, such as a voice call, a video call, or another sort of communication.

In some configurations, one or more nodes, such as nodes 112 illustrated in 5G CN 110 and/or nodes 116 illustrated in network 114 may be configured as one or more application servers that provide support for one more applications, such as application 107 used by one or more computing devices, such as UE 106. Some example applications include, but are not limited to browser applications, messaging applications, voice applications (e.g., Voice over Internet Protocol "VoIP" applications), video applications, and the like.

While the nodes 112 are illustrated within the 5G CN 110 and nodes 116 are illustrated in network 114, one or more other computing devices may be located outside of these networks. For example, an application server, or some other server or device, may be connected to a network via one or more external packet switched networks, such as the Internet.

According to some configurations, a telephony client application, such as application 107, on the UE 106 may establish data communication with the network 110 through a data connection to the cell 104. The cell 104 may route a communication wired/wirelessly from the UE 106 through the access network 102 for communication to the 5G CN 110. In general, a cell 104 can be implemented as a variety of technologies to provide wired and/or wireless access to the network, as discussed herein. In some instances, the cell 104 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the cell 104 can include any number and type of transceivers and/or base stations representing any number and type of macrocells, microcells, picocells, or femtocells, for example, with any type or amount of overlapping coverage or mutually exclusive coverage.

When a communication request arrives at the network 110, one or more of the nodes 112 may determine the identity of the originating computing device for the communication (e.g., using a telephone number, IMEI, IMSI, IP address) as well as the identity of the computing devices to send the communication. In some configurations, one or more of the nodes 116 may be used to determine the identity of the originating computing device for the communication as well as the identity of the computing devices to send the communication. According to some configurations, a UE 106 may connect to the service nodes 112, or some other component such as an application server, via the Internet (not illustrated).

As illustrated, the environment 100 includes one or more servers, including nodes 112 and 116, to facilitate communications by and between the various devices in the environment 100 and perform operations relating to using the network 114, the data network 128, and/or other networks. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 100 (e.g., nodes 112A-112S that provide network functions (NFs) 120A-120D, Access and Mobility Management Function (AMF) 122, Session Management Function (SMF) 124, user-plane functions (UPFs) 126, nodes 116A-116Q that provide NFs 120E-120I, websites, etc.). While FIG. 1 illustrates an example environment 100, it is understood in the context of this document, that the techniques discussed herein may also be implemented in other networking technologies.

The 5G core network 110 may expose network Functions (NFs) to nodes within the network 110, and/or nodes within some other network, such as network 114 and/or network 128. As illustrated, the 5G CN exposes NFs 120A-120D, AMF 122, SMF 124, and UPFs 126.

In some examples, the UE 106 requests a new session that is received by an AMF 122. The AMF 122 receives the request from the UE 106 and handles connection or mobility management requests while forwarding session management requirements to the SMF 124. The AMF 122 may determine which SMF 124 to use by querying a Network Repository Function (NRF), such as NRF 222 illustrated in FIG. 2. According to some configurations, the SMF 124 may access and/or store data that identifies the connected cell-IDs associated with UEs and the corresponding connected UPFs.

As briefly discussed above, using techniques described herein, a UE 106 is not limited to using an initially configured mode (e.g., either NR CA or NR DC) in a stand-alone (SA) 5G cellular network. For example, a UE 106 can be configured to use NR DC during a communication session while the UE 106 is near the cell 104, and switch to NR CA when the UE 106 moves away from the cell 104 and is closer to mid-cell or the cell edge.

As an example, a UE 106 can be initially configured to use NR DC or NR CA at registration and/or upon completion of a hand-over procedure. After the initial configuration, the cell 104 can monitor power headroom reports (PHRs) received from the UE 106. The cell 104 may use data from the PHRs to determine when to switch the UE 106 from/to NR DC and/or pass this data to one or more other nodes to determine when to switch the UE 106 from/to NR DC.

In some examples, the range of values contained in the PHR is from −23 dB to +40 dB in steps of 1 dB. Positive dB values indicate the difference between a maximum UE transmit power for the UE 106 and a current UE transmit power of the UE 106. Negative values indicate the difference between the maximum UE transmit power and the calculated UE transmit power. The PHRs can be received by the cell 104 (e.g., the gNB(s) connected to the UE) periodically, when the downlink path loss changes by a specific amount, and/or received based on some other parameter(s).

In some configurations, cell 104, or some other device or component, determines if the UE transmission (TX) power indicates that the UE is near the cell 104 that represents a near cell condition, or if the UE TX power indicates that the UE 106 is farther away from the cell 104 and the UE 106 is experiencing mid-cell or cell edge conditions.

For instance, if the UE 106 is using NR DC, then when the PHR indicates that enough power is left for UE TX power, then the UE 106 stays in NR DC mode. Conversely, when the PHR indicates that the UE 106 is running out of TX power, then the UE 106 can be reconfigured to use NR CA. By switching to/from NR DC, poor performance of the UE 106 (e.g., when the UE is near/on the cell edge) can be avoided. Further, by switching to NR CA from NR DC, the UE coverage can be extended using different frequency bands. More details are provided below with regard to FIGS. 2-5.

Figure 2:
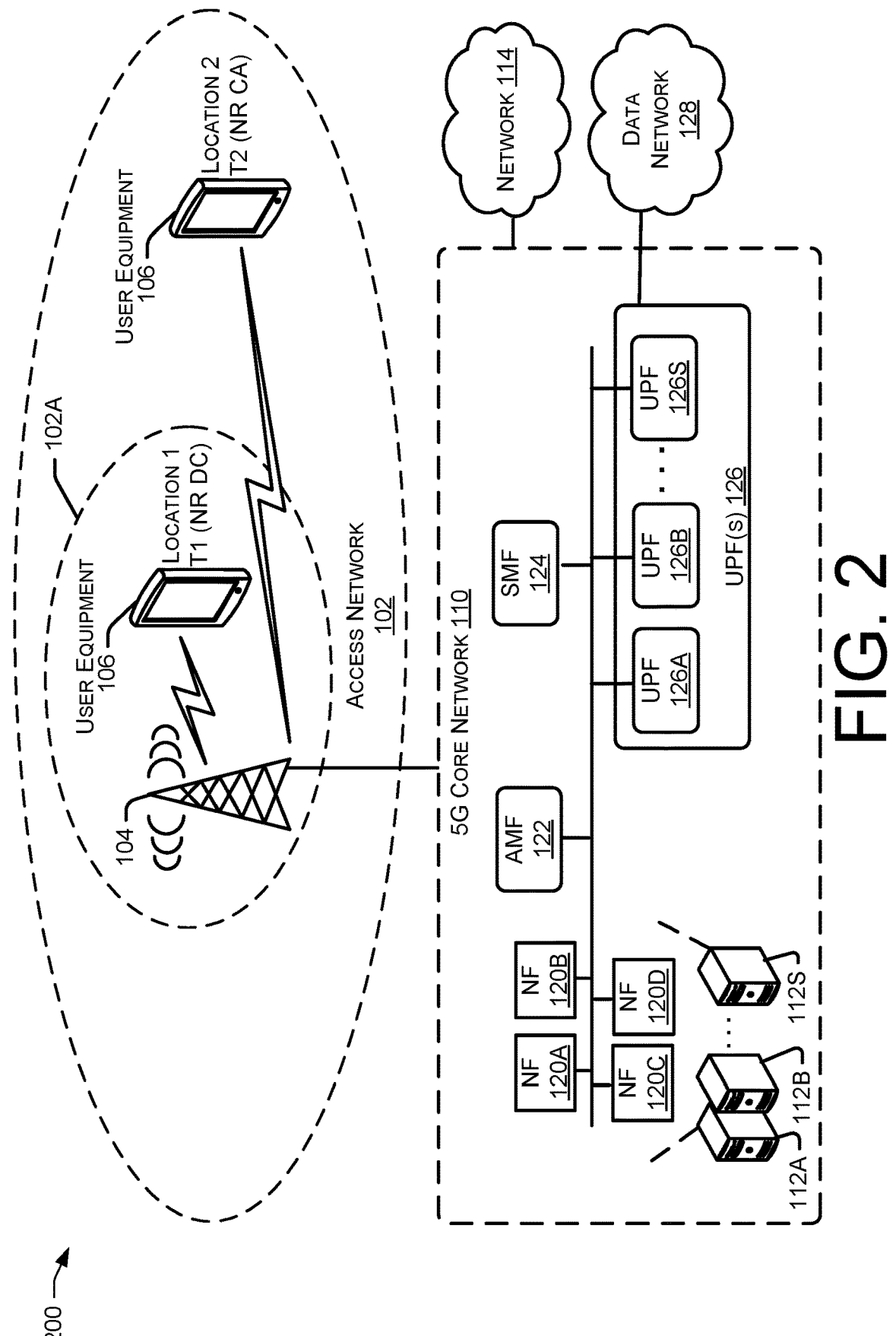
FIG. 2 is a block diagram of an illustrative environment including a 5G core network showing switching between NR DC and NR CA.

FIG. 2 is a block diagram of an illustrative environment 200 including a 5G core network showing switching between NR DC and NR CA. The environment 200 illustrates the UE 106 switching between NR DC and NR CA depending on network conditions.

According to some configurations, different NFs, such as NFs 120A-120D, are connected together using a common API which may be referred to herein as a service-based interface (SBI). In some examples, a NF service can directly access other NF services without having to pass through another node. Generally, nodes on the user plane handle the processing of packets between radio access network (RAN) and a data network. The UPFs 126 provide functionalities such as access control, encapsulation/decapsulation, bearer lookup, service data flow (SDF) mapping, per-flow Quality of Service (QoS), guaranteed bit rate (GBR), maximum bit rate (MBR), forwarding of packets, packet inspection, and the like. In some examples, a control plane node(s) may select user plane nodes based on location information of the UE and the location of the user plane nodes that may provide a requested service.

Subscriber sessions may be anchored on user plane NFs located either on edge locations or centralized data centers. Because of mobility of subscribers from a first location (e.g., x) to a second location (e.g., y), and/or changing network conditions, there may be a benefit to switch the communication mode used by a UE between NR DC and NR CA.

In some cases, a 5G CN 110 and the network 114 can interact seamlessly via internetwork service discovery. The AMF 122 connects to UE 106 and a cell 104, that may include one or more gNbs, and manages UE 106 related functions. In some examples, access and mobility functions are performed by AMF 122.

As illustrated, the UE 106 is initially located at location 1 within access network 102 and then at some point moves to location 2 within access network 102. At location 1 that is within area 102a, the UE 106 is near cell 104 and is within range of the FR2 frequency bands.

As discussed above, the UE 106 may initially select which mode to use for communication from NR DC and NR CA. When the UE 106 is close to the cell 104 as indicated by the area 102 within the dashed lines, the UE 106 can be configured to use NR DC that can use the FR2 bands for download, and the FR1 bands for upload. When the UE 106 is not near cell, as indicated when the UE 106 is outside of the area 102A, then the UE 10-6 can be configured to use NR CA.

In some examples, when the UE 106 moves from near cell (as indicated when within area 102A) and mid-cell or cell edge as indicated when UE 106 is outside of area 102A, the UE 106 can be configured to switch modes. As illustrated, when UE 106 moves from location 1 to location 2, the mode used by the UE 106 is switched from NR DC to NR CA.

In some examples, the UE 106 monitors network conditions that can be used by cell 104, or some other device or component, to determine when the UE 106 is near cell and when the UE 106 is mid-cell or near a cell edge. According to some configurations, a gNB connected to the UE 106 can monitor PHRs received from the UE 106. The gNb may use data from the PHRs to determine when to switch from/to NR DC and/or pass this data to one or more other nodes to determine when to switch from/to NR DC. In some examples, the switch to NR CA is made before the UE 106 runs out of transmission power that is used for the signaling used to switch to NR CA. For instance, the switch to NR CA can be made during a time the PHR indicates that there is enough power headroom to make the switch.

As such, when the PHR indicates that the UE 106 is running out of TX power, then the UE can be reconfigured to use NR CA. By switching to/from NR DC, poor performance of the UE (e.g., when the UE is near/on the cell edge)

can be avoided. Further, by switching to NR CA from NR DC, the UE 106 can use the higher bandwidths available from FR2.

Figure 3:
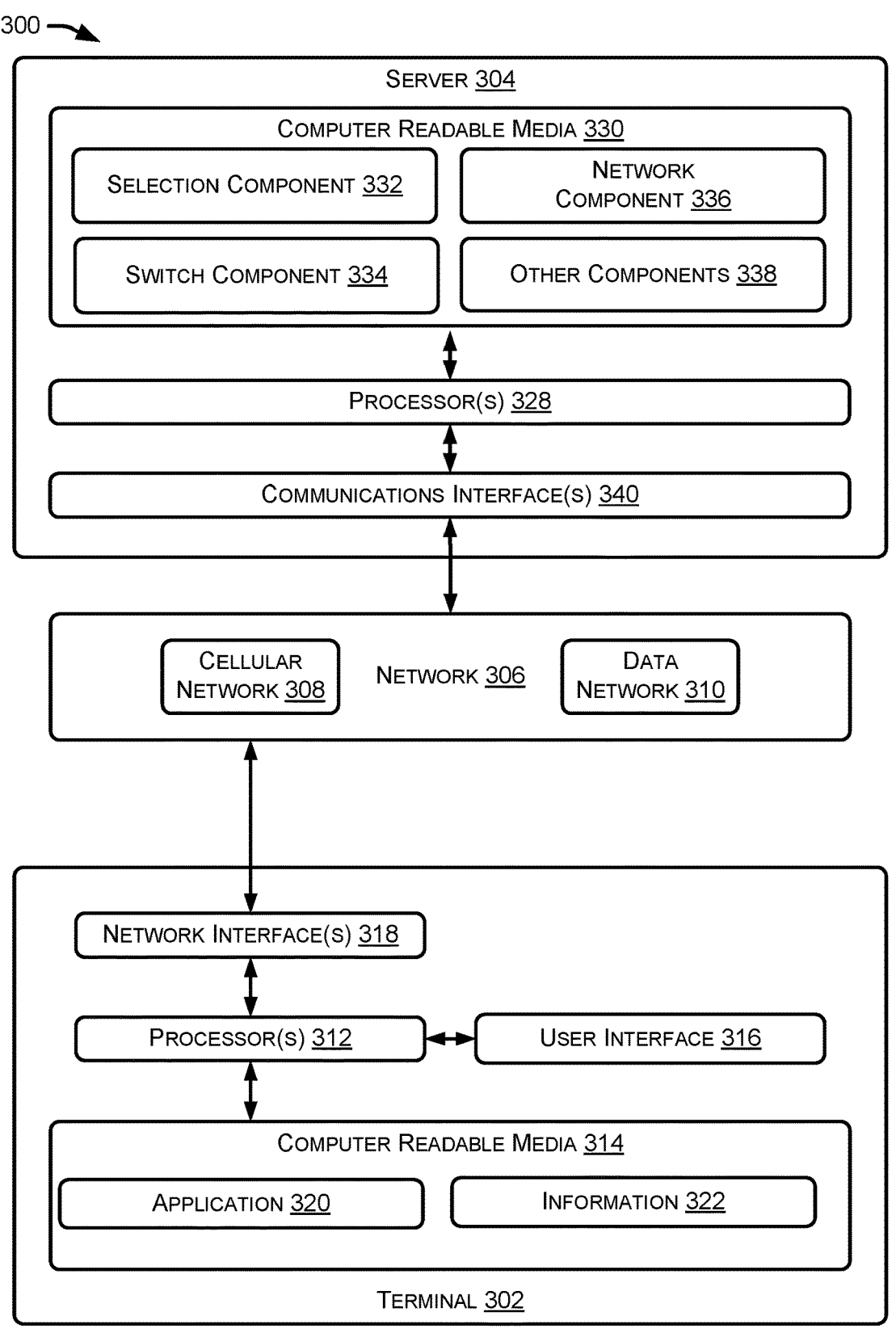
FIG. 3 is a block diagram illustrating a system that includes one or more components for switching between NR DC and NR CA in cellular networks.

FIG. 3 is a block diagram illustrating a system 300 that includes one or more components for switching between NR DC and NR CA in cellular networks. The system 300 includes a terminal 302, which can represent a UE 106, or another computing device, coupled to a server 304, via a network 306. The server 304 can represent a computing device, such as one or more of the servers within the access network 102, the 5G CN 110, network 114, and/or some other computing device. The network 306 can represent network 110, 114, 128 and/or access network 102, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/5G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 102.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a selection component 432 which may be configured to select between NR DC and NR CA based, at least in part, on one or more network conditions (e.g., TX power) detected by UE 106, a switch component 334 which may configured to the selected NR DC/NR CA mode, a network component 336 that is configured to perform one or more network operations, as well as one or more other components 338. The processor-executable instructions can be executed by the one or more processors 328 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
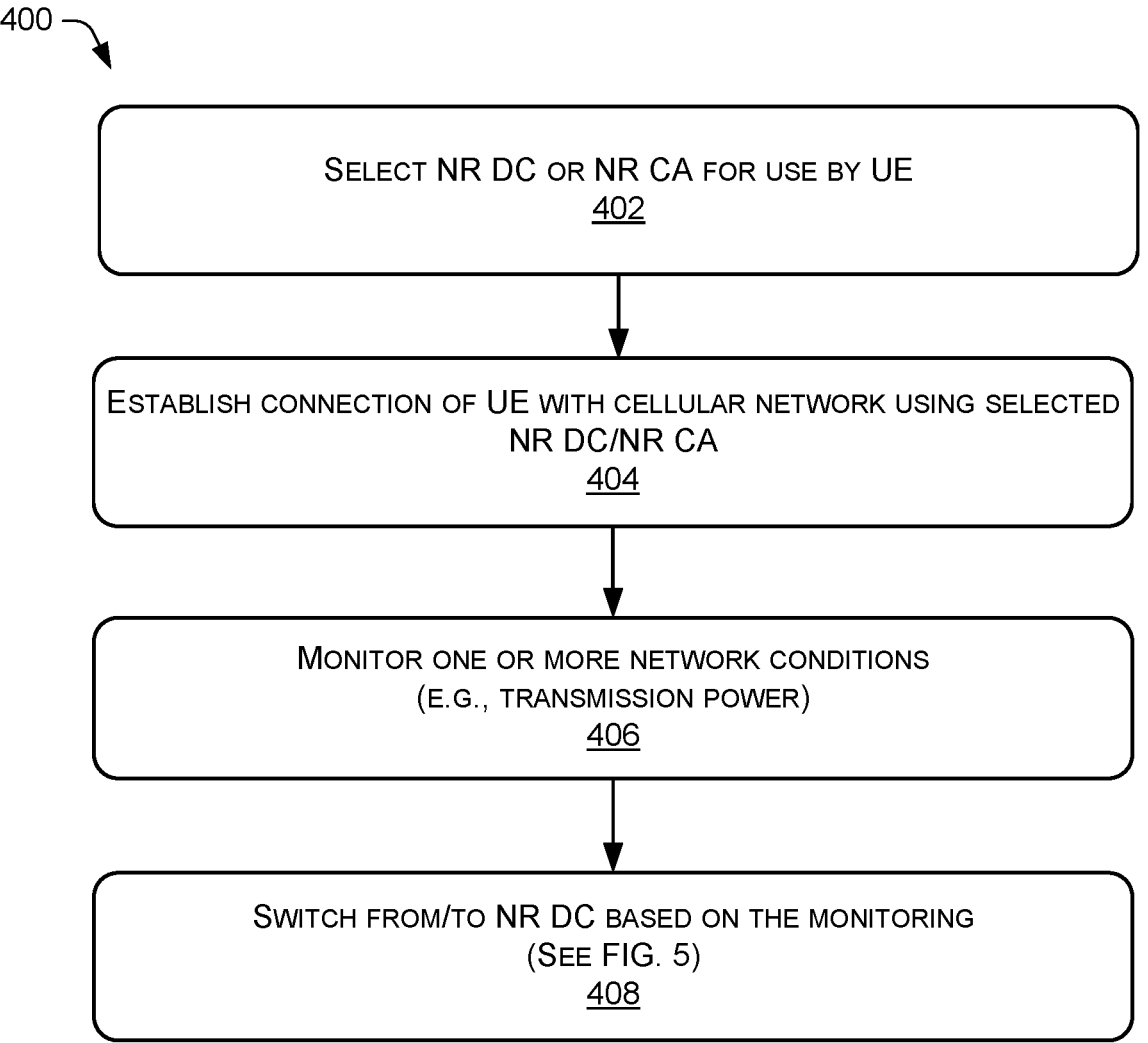
FIG. 4 is a flow diagram of an example process that includes switching between NR DC and NR CA in 5G cellular networks.
Figure 5:
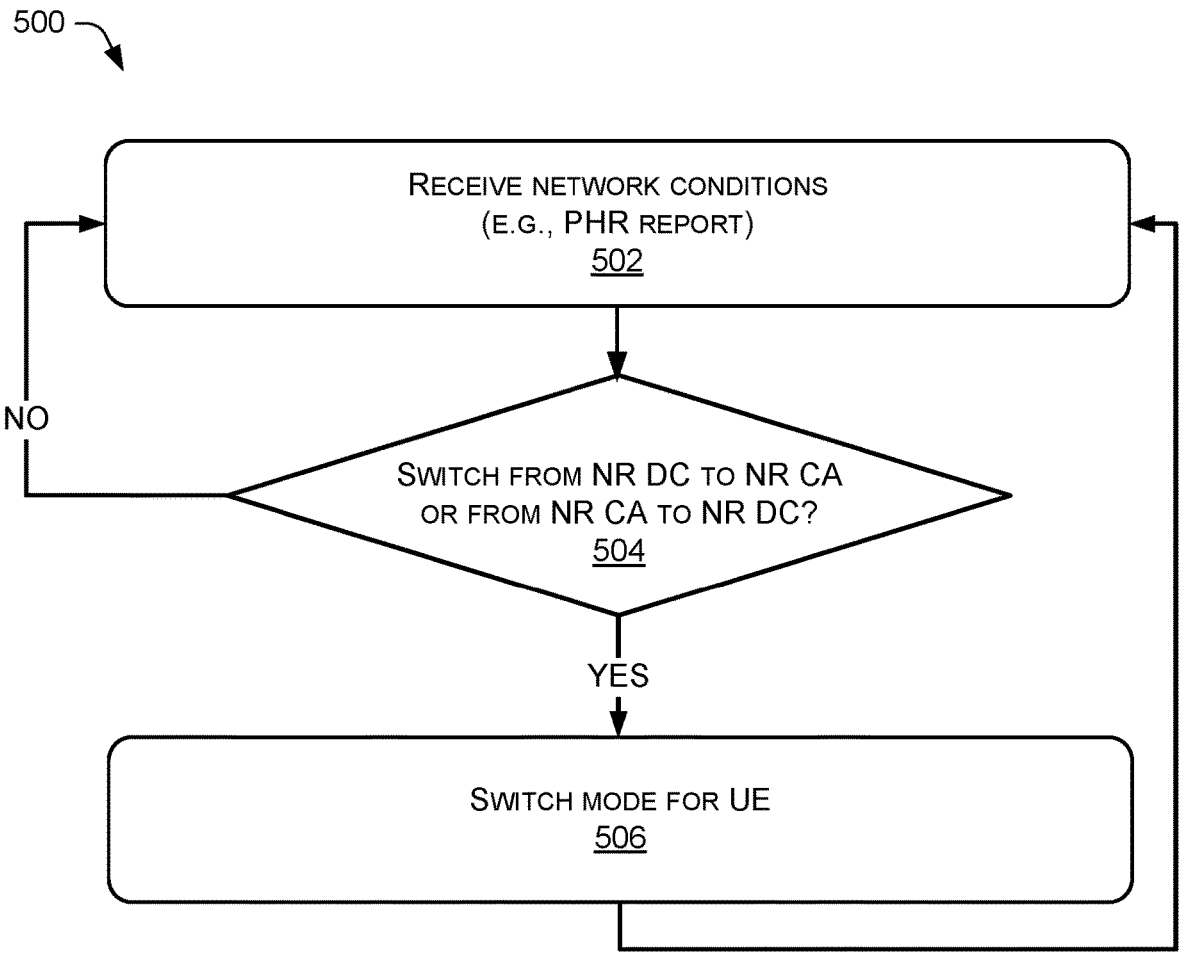
FIG. 5 is a flow diagram of an example process that includes determining when to switch between NR DC and NR CA in cellular networks based on network conditions.

FIGS. 4-5 illustrate example processes. The example processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 is a flow diagram of an example process that includes switching between NR DC and NR CA, in 5G cellular networks. The process includes, at 402, initially selecting to use NR DC or NR CA to use by the UE 106 during a communication session. As discussed above, when the UE 106 is near cell 104 and is within area 102A, then the selected mode can be NR DC. When the UE 106 is outside of area 102A and is mid-cell or near the cell edge NR CA can be selected.

At 404, the selected mode is used to establish a session with the UE 106. As discussed above, using techniques described herein, the UE 106 may later switch to a different mode (e.g., from NR DC to NR CA, or from NR CA to NR DC).

At 406, one or more network conditions are monitored. As discussed above, in some examples, the network conditions indicate whether the UE 106 is near cell, mid-cell, or near a cell edge. In some cases, the UE 106 monitors specified network conditions and can provide PHRs to one or more nodes, such as a connected gNB associated with cell 104. According to some configurations, other data may also be used to assist in determining what mode to select. For example, the available bandwidth, current usage statistics, forecasted usage statistics, and/or some other data that may indicate capability of the cell 104 to provide service at a desired level to the UE 106.

At 408, the mode can be switched from/to NR DC based on the network conditions. Generally, the mode is switched from NR DC to NR CA when the UE 106 moves toward mid-cell or cell edge. See FIG. 5 and related discussion for more details.

FIG. 5 is a flow diagram of an example process that includes determining when to switch between NR DC and NR CA, based on network conditions.

The process includes, at 502, receiving network conditions. As discussed above, in some configurations, the UE 106 provides PHRs to cell 104, and/or some other component or device, that includes data that indicates when the UE 106 is near cell, mid-cell, or near a cell edge. In other examples, the network conditions may be estimated by one or more components of the core network. For example, the cell 104 may estimate network conditions for the UE 106 based on data received/transmitted to the UE 106.

At 504, a determination is made as to whether to switch modes. As discussed above, the switch may be from NR DC to NR CA, or from NR CA to NR DC. When the network conditions indicate that the UE 106 is near cell, the cell 104 may determine to switch to NR DC if the mode is currently NR CA. When the UE 106 is outside of the near cell area 102a, then the cell 104 may determine to switch to NR CA if the mode is currently NR DC. When it is determined to switch, the process 500 moves to 506 where the mode is switched. When it determined that a switch is not to occur, the process 500 returns to 502.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
one or more processors;
a memory; and
one or more components stored in the memory and executable by the one or more processors to perform operations comprising:
    selecting a first mode of a communication session for a User Equipment (UE) within a 5G cellular network;
    establishing the communication session between the UE and one or more nodes within a cellular network that uses the first mode;
    accessing one or more network conditions associated with performance of the UE within the cellular network, wherein the one or more network conditions include at least a first amount of transmission power that is left for the UE to use and a second amount of transmission power being used by a current transmission, and wherein accessing the one or more network conditions comprises periodically receiving power headroom reports from the UE at a gNodeB, each power headroom report including a power headroom value in a range from a first negative dB value threshold to a second positive dB value threshold in steps of a predetermined DB value;
    identifying a cell condition associated with the UE based at least in part on the second amount of transmission power being used by the current transmission, wherein identifying the cell condition comprises determining whether the UE transmission power indicates that the UE is within a threshold distance of the gNodeB;
    determining to switch the first mode to a second mode based, at least in part, on the cell condition, the one or more network conditions, and on one or more of an available bandwidth or current usage statistics of the cellular network, wherein the second mode supports aggregation of multiple component carriers from a single gNodeB, and wherein determining to switch comprises switching in response to the power headroom report indicating that the UE is running out of transmission power while maintaining enough power headroom to perform the switching; and reconfiguring the UE to use the second mode.

2. The system of claim 1, wherein the first mode is selected from a New Radio (NR) Dual Connectivity (DC) mode and a NR Carrier Aggregation (CA) mode.

3. The system of claim 1, wherein the performance is associated with transmission of data within the cellular network.

4. The system of claim 1, wherein the second mode is one of an NR DC mode or an NR CA mode that is different from the first mode.

5. The system of claim 1, further comprising using the second mode for communications associated with the UE.

6. The system of claim 1, wherein accessing the one or more network conditions associated with performance of the UE within the cellular network comprises receiving a power headroom report (PHR) from the UE, wherein the PHR includes data that identifies a power headroom value for the UE.

7. The system of claim 1, wherein determining to switch the first mode to the second mode comprises identifying that the UE has moved toward a mid-cell condition or an edge cell condition.

8. The system of claim 7, wherein identifying that the UE has moved toward the mid-cell condition or the edge cell condition is based at least in part on transmission power of the UE.

9. The system of claim 1, wherein accessing the one or more network conditions associated with performance of a UE within the cellular network comprises receiving, at a gNodeB (gNb), at least a portion of the one or more network conditions from the UE.

10. The system of claim 1, wherein the first mode is an NR DC mode that uses a first gNb and a second gNb of the 5G cellular network.

11. The system of claim 1, wherein determining to switch the first mode to the second mode comprises determining an availability of transmission power of the UE.

12. A computer-implemented method performed by one or more processors configured with specific instructions, the computer-implemented method comprising:

selecting a first mode of a communication session for a User Equipment (UE) within a 5G cellular network;

establishing the communication session between the UE and one or more nodes within a cellular network that uses the first mode;

accessing one or more network conditions associated with performance of the UE within the cellular network, wherein the one or more network conditions include at least a first amount of transmission power that is left for the UE to use and a second amount of transmission power being used by a current transmission, and wherein accessing the one or more network conditions comprises periodically receiving power headroom reports from the UE at a gNodeB, each power headroom report including a power headroom value in a range from a first negative dB value threshold to a second positive dB value threshold in steps of a predetermined DB value;

identifying a cell condition associated with the UE based at least in part on the second amount of transmission power being used by the current transmission, wherein identifying the cell condition comprises determining whether the UE transmission power indicates that the UE is within a threshold distance of the gNodeB;

determining to switch the first mode to a second mode based, at least in part, on the cell condition, the one or more network conditions, and on one or more of an available bandwidth or current usage statistics of the cellular network, wherein the second mode supports aggregation of multiple component carriers from a single gNodeB, and wherein determining to switch comprises switching in response to the power headroom report indicating that the UE is running out of transmission power while maintaining enough power headroom to perform the switching; and reconfiguring the UE to use the second mode.

13. The computer-implemented method of claim 12, wherein accessing the one or more network conditions associated with performance of the UE within the cellular network comprises receiving data from the UE, wherein the data identifies a power headroom value for the UE.

14. The computer-implemented method of claim 12, wherein determining to switch the first mode to the second mode comprises identifying that the UE has moved toward a mid-cell condition or an edge cell condition.

15. The computer-implemented method of claim 14, further comprising identifying that the UE has moved toward the mid-cell condition.

16. The computer-implemented method of claim 12, wherein accessing the one or more network conditions associated with performance of a UE within the cellular network comprises receiving, at a gNodeB (gNb), at least a portion of the one or more network conditions from the UE.

17. The computer-implemented method of claim 12, wherein the first mode is an NR DC mode that uses a first gNb and a second gNb of a 5G cellular network.

18. A non-transitory computer-readable media storing computer-executable instructions that, when executed, cause one or more processors of a computing device to perform acts comprising:

selecting a first mode of a communication session for a User Equipment (UE) within a 5G cellular network;

establishing the communication session between the UE and one or more nodes within a cellular network that uses the first mode;

accessing one or more network conditions associated with performance of the UE within the cellular network, wherein the one or more network conditions include at least a first amount of transmission power that is left for the UE to use and a second amount of transmission power being used by a current transmission, and wherein accessing the one or more network conditions comprises periodically receiving power headroom reports from the UE at a gNodeB, each power headroom report including a power headroom value in a range from a first negative dB value threshold to a second positive dB value threshold in steps of a predetermined DB value;

identifying a cell condition associated with the UE based at least in part on the second amount of transmission power being used by the current transmission, wherein identifying the cell condition comprises determining whether the UE transmission power indicates that the UE is within a threshold distance of the gNodeB;

determining to switch the first mode to a second mode based, at least in part, on the cell condition, the one or more network conditions, and on one or more of an available bandwidth or current usage statistics of the cellular network, wherein the second mode supports aggregation of multiple component carriers from a single gNodeB, and wherein determining to switch comprises switching in response to the power headroom report indicating that the UE is running out of transmission power while maintaining enough power headroom to perform the switching; and reconfiguring the UE to use the second mode.

19. The system of claim 1, wherein the cell condition includes a near-cell condition.

20. The system of claim 1, wherein the cell condition indicates that the UE is near a cell and represents a near cell condition or indicates that the UE is farther away from the cell and that the UE is experiencing a mid-cell condition or cell edge condition.

\* \* \* \* \*